(12) United States Patent
Pundak

(10) Patent No.: US 12,056,311 B2
(45) Date of Patent: Aug. 6, 2024

(54) TOUCH SCREEN AND TRACKPAD TOUCH DETECTION

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/549,228

(22) PCT Filed: Mar. 11, 2022

(86) PCT No.: PCT/US2022/071090
§ 371 (c)(1),
(2) Date: Sep. 6, 2023

(87) PCT Pub. No.: WO2022/213014
PCT Pub. Date: Oct. 6, 2022

(65) Prior Publication Data
US 2024/0160315 A1    May 16, 2024

(30) Foreign Application Priority Data
Mar. 31, 2021    (NL) .................................... 2027879

(51) Int. Cl.
*G06F 3/041*    (2006.01)
*G06F 3/0354*    (2013.01)
*G06F 3/038*    (2013.01)

(52) U.S. Cl.
CPC ...... *G06F 3/04166* (2019.05); *G06F 3/03547* (2013.01); *G06F 3/038* (2013.01)

(58) Field of Classification Search
USPC ........................................................ 345/173
See application file for complete search history.

(56) References Cited

U.S. PATENT DOCUMENTS

| 8,775,966 B2 | 7/2014 | Stolyarov et al. |
| 9,158,364 B2 | 10/2015 | Nakajima et al. |
| 9,430,085 B2 | 8/2016 | Durojaiye et al. |
| 9,483,141 B2 | 11/2016 | Hotelling et al. |
| 9,710,137 B2 | 7/2017 | Feng et al. |

(Continued)

FOREIGN PATENT DOCUMENTS

KR    20100132572 A    12/2010

OTHER PUBLICATIONS

"Interactive Touch Laptop Experiments", Retrieved from: https://smus.com/touch-laptop-experiments/, Feb. 21, 2013, 6 Pages.

(Continued)

*Primary Examiner* — Chineyere D Wills-Burns
(74) *Attorney, Agent, or Firm* — Alleman Hall & Tuttle LLP

(57) ABSTRACT

Computing devices and methods for performing touch detection on a touch screen display and trackpad are disclosed. In one example, a trackpad input signal from a trackpad is received at a processor of the device. Using at least the trackpad input signal, a touch screen touch detection algorithm is modified. A touch screen input signal is then received at the processor from the touch screen display. The touch screen input signal is processed with the modified touch screen touch detection algorithm.

18 Claims, 7 Drawing Sheets

(56) References Cited

U.S. PATENT DOCUMENTS

| | | |
|---|---|---|
| 10,452,174 B2 | 10/2019 | Westerman et al. |
| 10,599,236 B2 | 3/2020 | Thompson et al. |
| 2006/0026521 A1 | 2/2006 | Hotelling et al. |
| 2007/0236460 A1* | 10/2007 | Young .................. G06F 3/04886 345/169 |
| 2010/0007612 A1* | 1/2010 | Locker .................. G06F 3/0418 345/173 |
| 2012/0026118 A1* | 2/2012 | Hackborn ........... G06F 3/03547 345/173 |
| 2012/0235938 A1* | 9/2012 | Laubach ............. G06F 3/04883 345/173 |
| 2013/0300668 A1* | 11/2013 | Churikov ............ G06F 3/04883 345/173 |
| 2014/0043259 A1* | 2/2014 | Park ...................... G06F 1/1618 345/173 |
| 2014/0062893 A1 | 3/2014 | Kawalkar |
| 2014/0106814 A1* | 4/2014 | Schmidt ................ G06F 3/0393 455/556.1 |
| 2014/0184519 A1* | 7/2014 | Benchenaa ........... G06F 1/1626 345/173 |
| 2014/0320428 A1* | 10/2014 | Matsuda ............... G06F 3/0416 345/173 |
| 2017/0177203 A1* | 6/2017 | Davidov ............. G06F 3/04883 |
| 2018/0088786 A1* | 3/2018 | Abzarian ............ G06F 3/04186 |
| 2018/0335921 A1* | 11/2018 | Karunamuni ....... G06F 3/04842 |
| 2020/0409551 A1 | 12/2020 | Marsden et al. |

OTHER PUBLICATIONS

"Search Report and Written Opinion Issued in Netherlands Patent Application No. N2027879", Mailed Date: Jan. 3, 2022, 12 Pages.

"International Search Report and Written Opinion Issued in PCT Application No. PCT/US22/071090", Mailed Date: Jun. 17, 2022, 14 Pages.

Sugimoto, et al., "HybridTouch: An Intuitive Manipulation Technique for PDAs using their Front and Rear Surfaces", In Proceedings of the 8th Conference on Human-Computer interaction with Mobile Devices and Services, Sep. 12, 2006, pp. 137-140.

* cited by examiner

TOUCH SCREEN AND TRACKPAD TOUCH DETECTION

CROSS REFERENCE TO RELATED APPLICATIONS

The present application is a U.S. National Phase of International Patent Application Serial No. PCT/US2022/071090 entitled "TOUCH SCREEN AND TRACKPAD TOUCH DETECTION", filed Mar. 11, 2022, which claims priority to Netherlands Patent Application Serial No. 2027879, filed Mar. 31, 2021, now granted as U.S. Pat. No. 2,027,879, the entire contents of each of which are hereby incorporated by reference for all purposes.

BACKGROUND

Some computing devices include a touch screen display and a trackpad for receiving user inputs. Touch inputs from the touch screen and trackpad subsystems are processed at an abstraction or application layer. In these devices it can be challenging to balance fast touch detection, noise immunity and power efficiency.

SUMMARY

Examples are disclosed that relate to computing devices, methods and computer programs for performing touch detection on a touch screen display and a trackpad. In one example, a method is disclosed for performing touch detection on a touch sensitive interface of a computing device that includes first and second touch sensitive interfaces and a processor. A first touch input signal from the first touch sensitive interface is received at the processor. Using at least the first touch input signal a touch detection algorithm associated with the second touch sensitive interface is modified to a modified touch detection algorithm. A second touch signal is then received at the processor from the second touch sensitive interface. The second touch input signal is processed with the modified touch detection algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many computing devices utilize multiple touch sensitive interfaces, such as a touch screen display and a trackpad, for receiving user inputs. Such inputs may be utilized for a wide variety of functions, such as controlling a pointer displayed on the touch screen display and selecting displayed items. In many devices, inputs from both a touch screen subsystem and trackpad subsystem are processed at an abstraction layer such as an application layer. Processing this data in an application layer introduces latencies that can delay system calculations and response times, with such inefficiencies preventing the effective utilization of data from different touch subsystems. In these devices, providing fast responses to user inputs while also achieving acceptable noise immunity and power efficiency can prove challenging.

As described in more detail below, configurations of the present disclosure fuse data from two different touch sensitive interfaces to provide improved noise immunity and decreased touch detection latency while also consuming less power. In some examples described herein, trackpad input signals are utilized to modify a touch screen touch detection algorithm to provide enhanced noise immunity, decreased touch detection latency, and lower power consumption in the touch screen display. Similarly, in other examples touch screen input signals are utilized to modify a trackpad touch detection algorithm to provide enhanced noise immunity, decreased touch detection latency, and lower power consumption in the trackpad.

Figure 1:
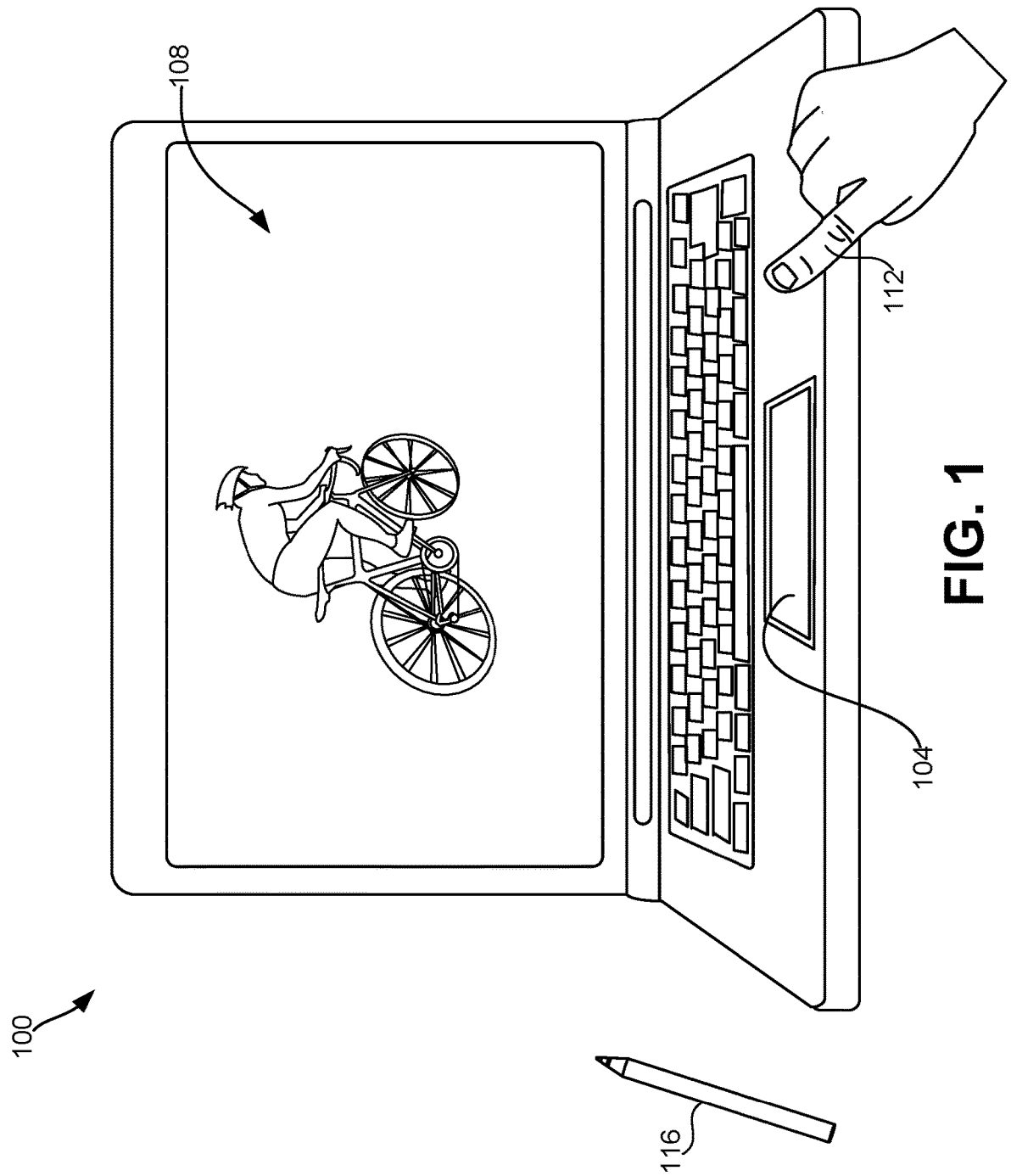
FIG. 1 shows one example of a computing device according to examples of the present disclosure.
Figure 2:
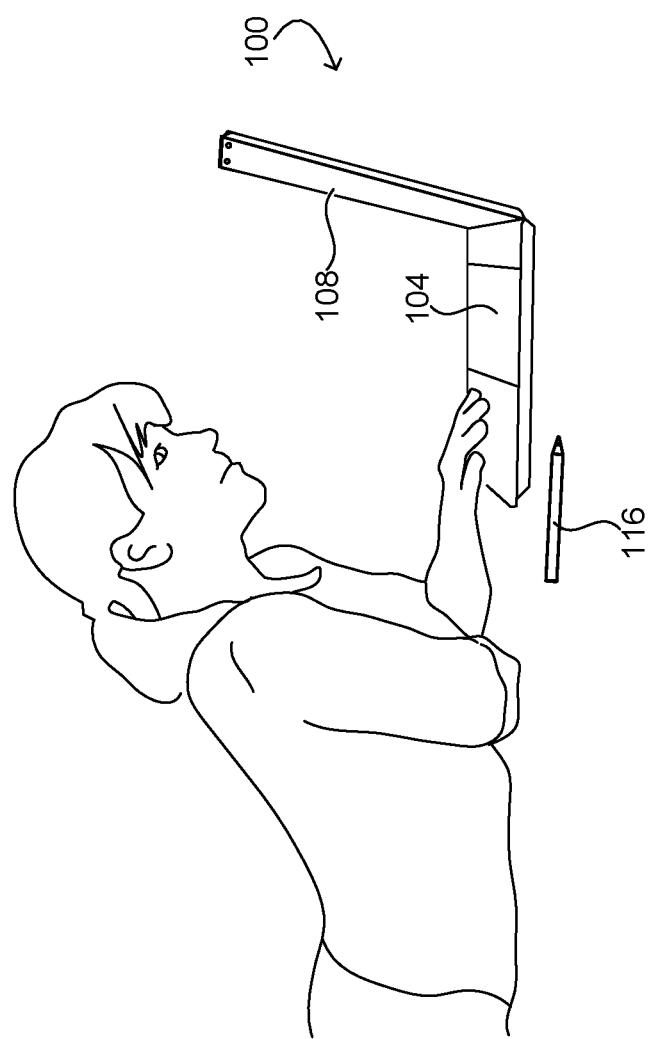
FIG. 2 shows a user interacting with the computing device of FIG. 1
Figure 3:
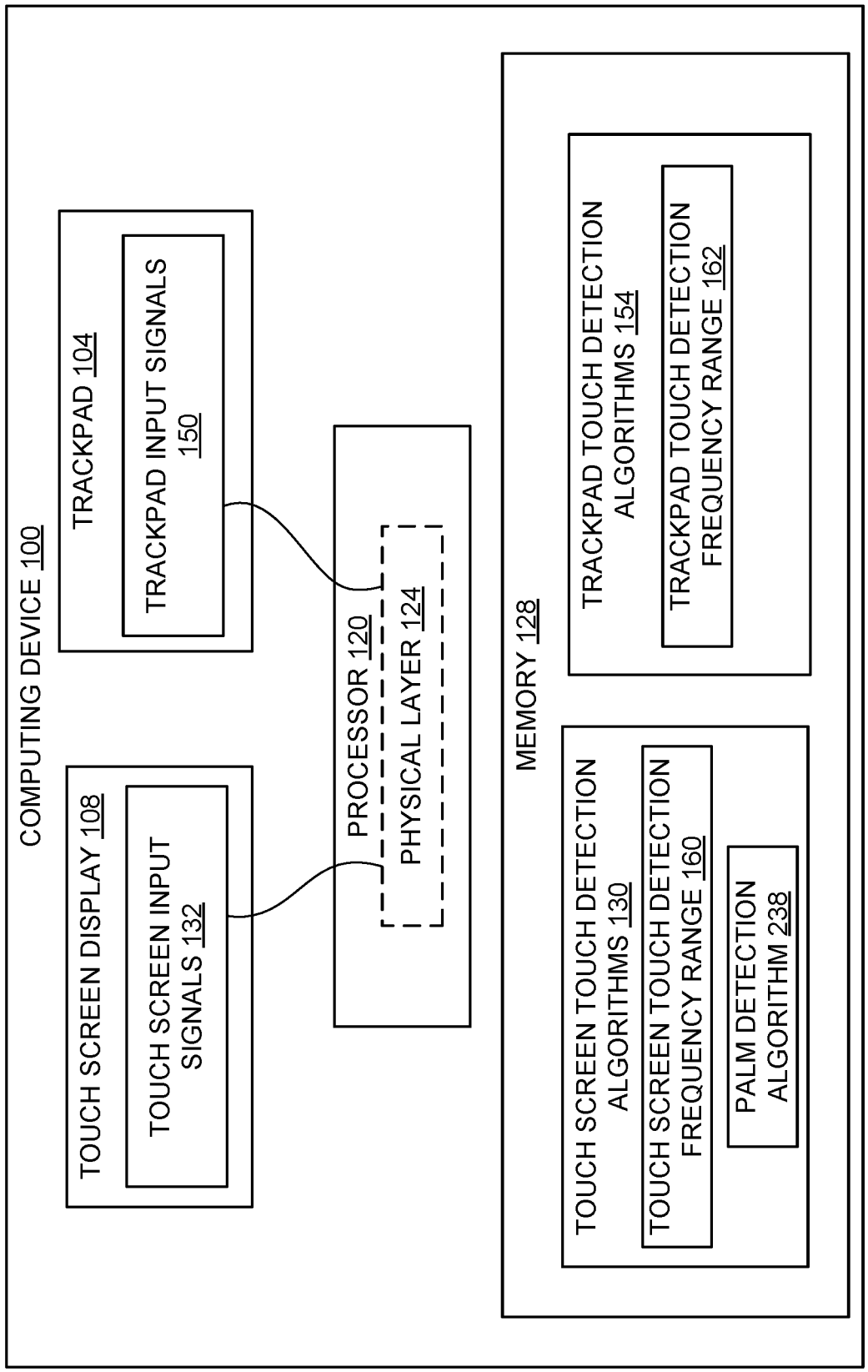
FIG. 3 shows a schematic view of components of the computing device of FIG. 1 including a touch screen display and trackpad according to examples of the present disclosure.

With reference now to FIGS. 1-3, an example computing device 100 in the form of a laptop computer is illustrated. In other examples, aspects of the present disclosure can be implemented in tablet computing devices, mobile computing devices, and any other type of computing device that utilizes multiple touch sensitive interfaces.

Computing device 100 includes a trackpad 104 and touch screen display 108. As described in more detail below, in different examples a user provides user inputs to the trackpad by touching the trackpad 104 with one or more digits 112 of the user's hand. Similarly, a user provides user inputs via the touch screen display 108 by touching or placing near the display one or more digits 112 of the user's hand and/or an input device, such as a stylus 116. In different examples, active styli and passive styli may be utilized.

In some examples, the touch screen display 108 is a mutual capacitance touch screen display. In these examples, touch inputs are identified by sampling capacitance between a driving electrode and a sensing electrode. Driving electrodes are arranged in an array within the touch screen display. Signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based on determining which driving electrodes were being driven when the touch input occurred, and the frequency of the signal driving each driving electrode.

Detecting this current also includes detecting the current flow into various sensing electrodes that results from the increased capacitive coupling between the driving electrodes and the sensing electrodes caused by the finger or other conductive object providing the touch input. In other examples, the principles of the present disclosure may be utilized with touch screen displays employing other touch detection technologies, including but not limited to resistive touch detection, self-capacitance touch detection, and projected capacitance touch detection.

Trackpad 104 is configured to detect the position and movement of a user's finger(s) and/or thumb and translate such position/movement to a relative position on the touch screen display 108. In some examples and similar to the touch screen display 108, trackpad 104 can utilize a capacitive sensing subsystem having a plurality of driving electrodes and a plurality of intersecting sensing electrodes that form sensing nodes. The presence of a finger, stylus or other object on or near the trackpad 104 is detected by measuring changes to capacitance at the sensing node(s) that are touched or near the object. In other examples, trackpad 104 can utilize other sensing technologies, such as resistive touch sensing, inductive touch sensing, optical imaging touch sensing, or any other touch detection technology that can be used on computing devices of the present disclosure.

As used herein, "user input" refers to any input detected by touch screen display 108 or trackpad 104 and caused by proximity or contact of an input object with the surface of the touch-sensitive display. Non-limiting examples of suitable input objects include human fingers, other portions of a human hand, and styli (including active and passive styli).

As noted above, in many devices inputs from a touch screen display and a trackpad are processed at an abstraction layer such as an operating system layer. The latencies introduced by processing this data from the two touch input subsystems can inhibit effective utilization of this data. In the present examples and with reference to FIG. 3, and in one potential advantage of the present disclosure, computing device 100 utilizes a processor 120 that receives touch input signals from both the trackpad 104 and touch screen display 108 via a physical layer 124. In this manner, data from both the trackpad 104 and touch screen display 108 can be processed much more quickly at this fundamental layer as compared to the data translation, coordination and other transformations needed for processing touch data received at an abstraction layer.

Computing device 100 includes memory 128 that stores instructions executable by the processor 120. For example, and as described in more detail below, the memory 128 stores instructions executable by the processor 120 to perform touch detection on the trackpad 104 and the touch screen display 108 using touch input signals received via the physical layer 124.

In some examples the processor 120 is an ASIC that connects to physical channels in trackpad and touch screen display subsystems, and therefore enables operations to be performed on data from both subsystems much faster as compared to similar operations performed at an abstraction layer. Further and as described in more detail below, this configuration enables touch input signals from one subsystem to be used to enhance performance of the other subsystem in a substantially real-time manner.

As shown in FIG. 3, memory 128 includes touch screen touch detection algorithms 130 that are utilized to analyze and process touch screen input signals 132 received from the touch screen display 108. In some examples and as noted above, trackpad input signals 150 received from the trackpad 104 can be utilized to modify a touch screen touch detection algorithm 130 to a modified touch screen touch detection algorithm that provides enhanced noise immunity.

For example, and in one exemplary use case, touch screen display 108 is configured to detect user touch inputs by providing signals to driving electrodes in a selected frequency range, such as 50 kHz, that can be located within a larger operating range, such as between 0 kHz and 500 kHz. Initially, a touch screen touch detection frequency range 160 is set to 175 kHz-225 kHz. A user of computing device 100 begins using the trackpad 104. By analyzing the trackpad input signals 150, a trackpad touch detection algorithm 154 determines that the electrical network to which the device's power supply is connected is creating noise at approximately 200 kHz, which is within the current touch screen touch detection frequency range of 175 kHz-225 kHz of the touch screen display 108.

Because the subsystems of the touch screen display 108 and trackpad 104 share data with the processor 120 at the physical layer 124, this information regarding noise at 200 kHz from the trackpad subsystem is provided to the touch screen display subsystem with minimal latency, such as on the order of milliseconds, and while the user is still interacting with the trackpad. Using this information, a touch screen touch detection algorithm 130 is modified to a modified touch screen touch detection algorithm by changing the touch screen touch detection frequency range 160 in a manner that avoids overlap with the power supply noise at 200 kHz. For example, the touch screen touch detection frequency range 160 can be moved to 75 kHz-125 kHz.

Advantageously, when the user switches from interacting with the trackpad 104 to interacting with the touch screen display 108, the touch screen touch detection frequency range 160 has already been updated to avoid the power supply noise. Accordingly, when the user begins using the touch screen display 108 the user is immediately provided with an improved and noise-free user experience with the touch screen display.

In a similar manner, touch screen input signals 132 received from the touch screen display 108 can be utilized to modify the trackpad touch detection algorithms 154 to provide enhanced noise immunity. For example, and in one exemplary use case, the trackpad 104 detects user touch inputs by providing signals to driving electrodes in a selected frequency range, such as 50 kHz, located within a larger operating range, such as between 0 kHz and 500 kHz. Initially, a trackpad touch detection frequency range 162 is set to 250 kHz-300 kHz. A user of computing device 100 begins providing user inputs to the touch screen display 108. By analyzing the touch screen input signals 132, a touch screen touch detection algorithm 130 determines that the electrical network to which device's power supply is connected is creating noise at approximately 275 kHz.

Similar to the example described above, this information regarding noise at 275 kHz from the touch screen subsystem is provided to the trackpad subsystem via physical layer 124 with minimal latency and while the user is still interacting with the touch screen display 108. Using this information, a trackpad touch detection algorithm 154 is modified to a modified trackpad touch detection algorithm by changing the trackpad touch detection frequency range 162 in a manner that avoids overlap with the power supply noise at 275 kHz. For example, the trackpad touch detection frequency range 162 can be moved to 200 kHz-250 kHz As with the previous example, when the user switches from interacting with the touch screen display 108 to interacting with the trackpad 104, the trackpad touch detection frequency range 162 has already been updated to avoid the power supply noise. Accordingly, when the user begins using the trackpad 104 the user is immediately provided with a noise-free user experience.

In other examples, the determination by one subsystem that a user input is a valid user input can be used by the other subsystem to modify its touch detection algorithms to provide an enhanced user experience. For example, the trackpad touch detection algorithms 154 can include algorithms configured to analyze trackpad input signals 150 and determine whether they represent valid (user-intended) touch inputs to the trackpad. For example, the algorithms can utilize one or more thresholds, such as a minimal tap length (time period), to detect user-intended taps or selections and correspondingly distinguish other unintended trackpad touches.

In some examples, the trackpad touch detection algorithms 154 determine that a trackpad input signal 150 is a valid user input. In this case, while the user is interacting with the trackpad 104, it is very unlikely that the user will simultaneously interact with the touch screen display 108. Accordingly, and on condition of this determination that the trackpad input signal 150 is a valid user input, a touch screen touch detection algorithm 130 is then modified to reduce a touch detection sensitivity of the touch screen touch detection algorithm.

In some examples, the touch detection sensitivity may be reduced from a default sensitivity to a reduced sensitivity. In this manner, the scanning frequency of the touch screen display can be reduced to correspondingly reduce power consumption, improve energy efficiency, and conserve battery life when the computing device operates from battery power. Further, such reduced scanning frequency can be maintained as long as valid user inputs to the trackpad 104 are identified. In some examples, in addition to or instead of reducing the scanning frequency, a threshold signal-to-noise ratio (SNR) of the touch screen touch input signals 132 can be increased to a stricter detection mode that requires a higher SNR to qualify as a valid touch screen input. Accordingly, and in another potential advantage of the present disclosure, by reducing a touch detection sensitivity and/or increasing a threshold SNR at the touch screen display based on determining that a trackpad input signal 150 is a valid user input, invalid (non-intended) inputs at the touch screen display are more effectively ignored.

As noted above, because the trackpad 104 and touch screen display 108 are communicatively coupled to processor 120 via a physical layer 124, data regarding the valid user input at the trackpad 104 can be quickly shared and processed by the touch screen touch detection algorithms 130 to reduce the touch detection sensitivity while the user is interacting with the trackpad. Similarly, when the trackpad subsystem determines that the user has stopped interacting with the trackpad 104, this information is shared with the touch screen display subsystem. When the user stops using the trackpad 104, the user may be transitioning to interact with the touch screen display 108. Accordingly, and in some examples, when it is determined that the user has stopped using the trackpad 104, the touch screen touch detection sensitivity can be correspondingly increased to reflect the greater likelihood that the user will interact with the touch screen display 108.

In one example, after reducing the touch detection sensitivity of a touch screen touch detection algorithm 130, the trackpad subsystem determines that another valid user input to the trackpad is not received. For example, the trackpad subsystem may determine that another valid user input is not received during a predetermined time period after the previous valid user input, such as 250 milliseconds (ms), 500 ms, or other suitable time period. On condition of determining that another valid user input to the trackpad 104 is not received during the predetermined time period, the touch detection sensitivity of the touch screen touch detection algorithm is then increased.

Advantageously, when the user switches from interacting with the trackpad 104 to interacting with the touch screen display 108, the touch detection sensitivity of the touch screen touch detection algorithm 130 has already been increased. Accordingly, when the user begins using the touch screen display 108 the touch detection sensitivity has returned to its default sensitivity setting.

In a similar manner, touch screen input signals 132 received from the touch screen display 108 can be utilized to modify the trackpad touch detection algorithms 154 to reduce power consumption. As with the trackpad touch detection algorithms 154 described above, the touch screen touch detection algorithms 130 can include algorithms configured to analyze touch screen input signals 132 and determine whether they represent valid (user-intended) touch inputs to the touch screen. For example, the algorithms can utilize one or more thresholds, such as a minimal tap length (time period), to detect user-intended taps or selections and correspondingly distinguish other unintended touch screen touches.

In some examples, the touch screen touch detection algorithms 130 determine that a touch screen input signal 132 corresponds to a valid user input. In this case, while the user is interacting with the touch screen 108, it is very unlikely that the user will simultaneously interact with the trackpad 104. Accordingly, and on condition of this determination that the touch screen input signal 132 is a valid user input, a trackpad touch detection algorithm 154 is then modified to reduce a touch detection sensitivity. For example, the touch detection sensitivity may be reduced from a default sensitivity to a reduced sensitivity. In this manner, the scanning frequency of the trackpad 104 can be reduced to correspondingly reduce power consumption and improve energy efficiency. In some examples, in addition to or instead of reducing the scanning frequency, a threshold signal-to-noise ratio (SNR) of the trackpad input signals 150 can be increased to a stricter detection mode that requires a higher SNR to qualify as a valid trackpad input. Accordingly, and in another potential advantage of the present disclosure, by reducing a touch detection sensitivity and/or increasing a threshold SNR at the trackpad based on determining that a touch screen input signal 132 is a valid user input, invalid (non-intended) inputs at the trackpad are more effectively ignored.

As noted above, data regarding the valid user input at the touch screen 108 can be quickly shared via physical layer 124 and processed by the trackpad touch detection algorithms 154 to reduce the touch detection sensitivity while the user is interacting with the touch screen. Similarly, when the touch screen subsystem determines that the user has stopped interacting with the touch screen 108, this information can be shared with the trackpad subsystem. When the user stops using the touch screen 108, the user may be transitioning to interact with the trackpad 104. Accordingly and in some examples, when it is determined that the user has stopped using the touch screen 108, the trackpad touch detection sensitivity can be correspondingly increased to reflect the greater likelihood that the user will interact with the trackpad 104.

In one example, after reducing the touch detection sensitivity of a trackpad touch detection algorithm 154, the touch screen subsystem determines that another valid user input to the touch screen is not received. For example, the touch screen subsystem may determine that another valid user input is not received during a predetermined time period after the previous valid user input, such as 250 ms, 500 ms, or other suitable time period. On condition of determining that another valid user input to the touch screen 108 is not received during the predetermined time period, the touch detection sensitivity of the trackpad touch detection algorithm is then increased.

Advantageously, when the user switches from interacting with the touch screen display 108 to interacting with the trackpad 104, the touch detection sensitivity of the trackpad touch detection algorithm 154 has already been increased. Accordingly, when the user begins using the trackpad 104 the touch detection sensitivity has already been returned to its default sensitivity setting.

In addition to reducing power consumption, controlling the touch detection sensitivities of the trackpad 104 and touch screen display 108 as described above also enables touch detection latencies to be reduced. In some examples, lower touch detection latencies are achieved by increasing scanning frequencies, which correspondingly increases power consumption. With the configurations disclosed herein and as described above, determinations of a valid user input in one input subsystem can be utilized to achieve power savings in the other input subsystem. Accordingly, in these situations the scanning frequency in the subsystem receiving valid user inputs can be increased to correspondingly reduce touch detection latency in this subsystem. Further, the power savings realized in the other subsystem can offset the additional power requirements of the increased scanning frequency. Accordingly, in some examples the reduced touch detection latency can be provided while also meeting power consumption targets.

In some examples, information regarding an estimated handedness of a user can be utilized by touch screen displays to provide additional user experience features and/or enhanced performance related to user inputs with a stylus or user digits. In the present disclosure, the term "user handedness" refers to which hand (left or right) is the user's dominant hand. For example and as described further below, trackpad input signals 150 may be used to determine an estimated handedness of a user. This estimated handedness data is then used to modify one or more touch screen touch detection algorithms 130 to a modified touch screen touch detection algorithm that utilizes this data.

In some examples, user inputs to the trackpad 104 in the form of gestures can be analyzed to determine the handedness of a user. In one example, a user marks displayed text by using a thumb of one hand to press and hold a static location on the trackpad 104, and using a finger of that hand to touch and move along the surface of the trackpad to perform the marking gesture. A right-handed user will press and hold with her right thumb on a left side of the trackpad 104 and perform the marking gesture with her right index finger on the right side. By contrast, a left-handed user will press and hold with his left thumb on the right side of the trackpad and perform the marking gesture with his left index finger on the left side. In each case, the locations of the static and moving touch inputs can be used to determine the handedness of the user with high confidence. Other user inputs and gestures on the trackpad 104 may be utilized to determine the handedness of a user.

Handedness data determined using trackpad input signals 150 is then provided to processor 120 via the physical layer 124 and used to modify one or more touch screen touch detection algorithms 130. For example, the touch screen touch detection algorithms 130 can include one or more palm detection algorithms configured to recognize certain touch inputs as a user's palm and to reject such inputs as unintended. In one example, each "blob" of trackpad input signals 150 is classified via a heat map into one of several classes, such as Finger, Bunch (multiple peaks blob), or Palm. As frames of touch input signals are received, the track of frames remains in an "Uncertain" mode until a confidence level associated with one of the classes exceeds a confidence level threshold. For example, the confidence level thresholds may be predetermined likelihood-ratio (LLR) grades for statistical models corresponding to the classes. In these examples, a priori data of a user's handedness determined from the trackpad input signals 150 can be used by the palm detection algorithm(s) of the touch screen touch detection algorithms 130 to more definitively determine whether touch screen input signals 132 correspond to a user's palm.

Accordingly, by using the user handedness data from the trackpad 104 via the physical layer 124, the palm detection algorithm(s) can be rapidly updated to provide better user palm recognition when the user transitions from the trackpad to providing inputs to the touch screen display 108.

In other examples, a priori data regarding a user's handedness from the trackpad 104 can be used by the touch screen display 108 to provide more accurate writing predictions. In some touch screen displays, motion-based models and time-series mixed with noise processing (e.g., Kalman filters) are utilized to predict the upcoming direction of motion of a stylus, and thereby predict letters or numbers that will be written. Data regarding a user's handedness received from the trackpad 104 can be fused with stylus location data (e.g., stylus tilt, azimuth, and/or position) to better approximate the overall posture of the stylus and help predict where the stylus will move to next. Accordingly, by using the user handedness data from the trackpad 104 via the physical layer 124, one or more writing prediction algorithm(s) of the touch screen touch detection algorithms 130 can be rapidly updated to provide more accurate writing predictions when the user transitions from the trackpad to providing inputs to the touch screen display 108.

Figure 4A:
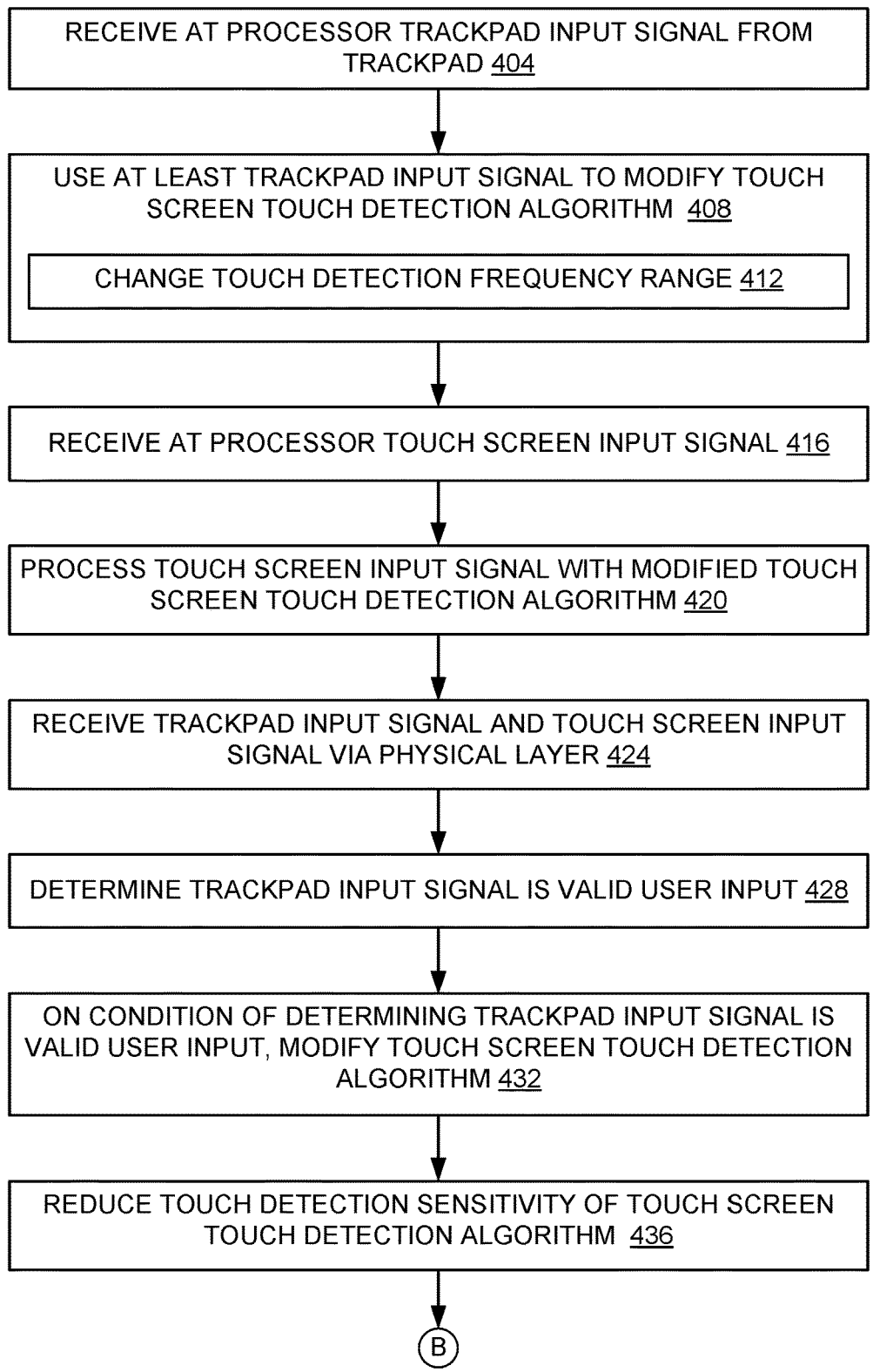
FIGS. 4A and 4B show a flow diagram of an example method for performing touch detection on a touch screen display according to examples of the present disclosure.
Figure 4B:
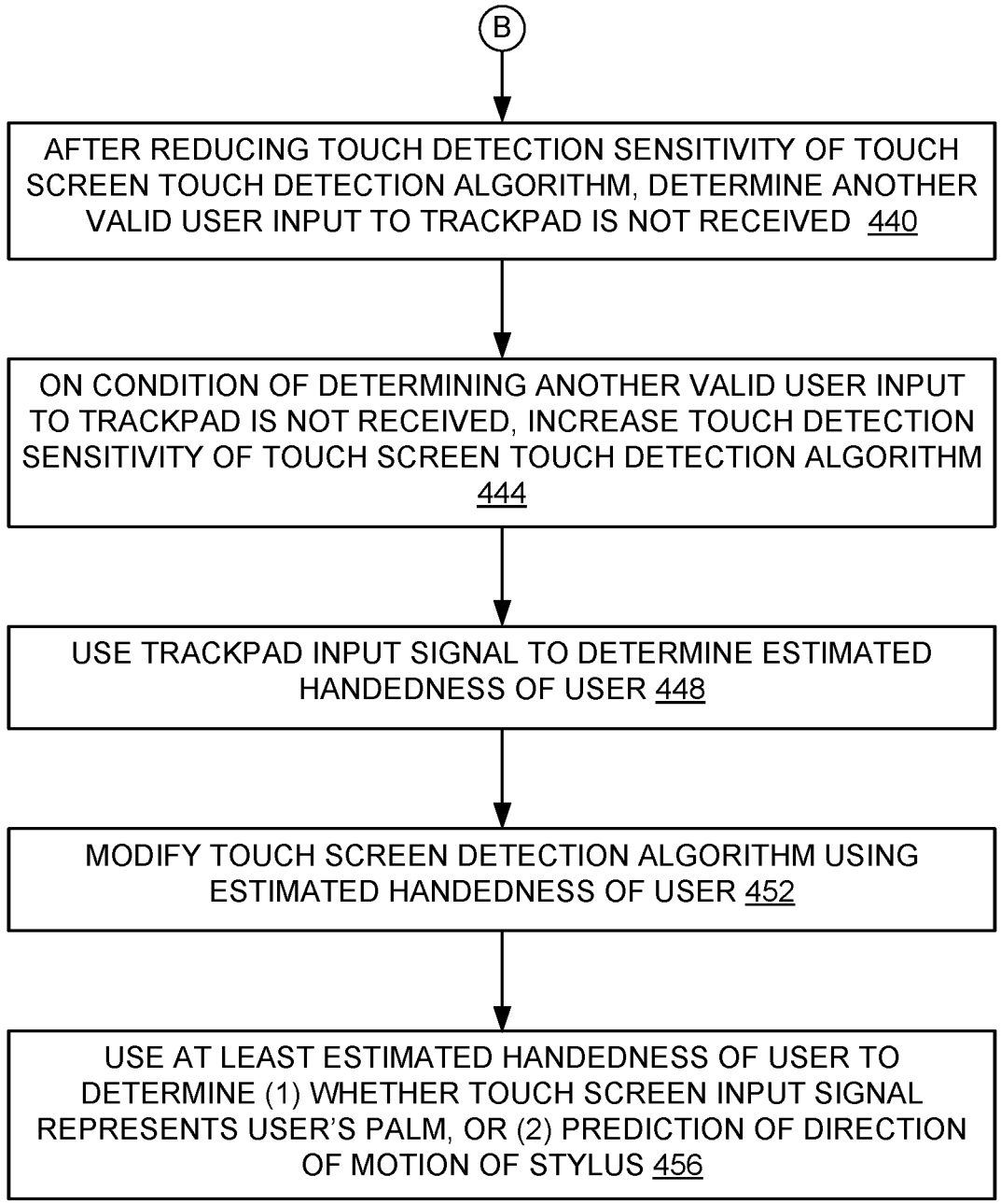

With reference now to FIGS. 4A and 4B, a flow diagram is illustrated depicting an example method 400 for performing touch detection on a touch sensitive interface. The following description of method 400 is provided with reference to the software and hardware components described herein and shown in FIGS. 1-3 and 6. For example, the method 400 may be performed by computing device 100, hardware, software, and/or firmware of the computing device 100, or a suitable combination of components described herein.

It will be appreciated that the following description of method 400 is provided by way of example and is not meant to be limiting. Therefore, it is to be understood that method 400 may include additional and/or alternative steps relative to those illustrated in FIGS. 4A-4B. Further, it is to be understood that the steps of method 400 may be performed in any suitable order. Further still, it is to be understood that one or more steps may be omitted from method 400 without departing from the scope of this disclosure. It will also be appreciated that method 400 also may be performed in other contexts using other suitable components.

With reference to FIG. 4A, at 404 the method 400 includes receiving at the processor a trackpad input signal from the trackpad. At 408 the method 400 includes using at least the trackpad input signal to modify a touch screen touch detection algorithm to a modified touch screen touch detection algorithm. At 412 the method 400 includes, wherein modifying the touch screen touch detection algorithm includes changing a touch detection frequency range. At 416 the method 400 includes receiving at the processor a touch screen input signal from the touch screen display. At 420 the method 400 includes processing the touch screen input signal with the modified touch screen touch detection algorithm.

At 424 the method 400 includes wherein the processor receives the trackpad input signal and the touch screen input signal via a physical layer. At 428 the method 400 includes determining that the trackpad input signal is a valid user input. At 432 the method 400 includes, on condition of determining that the trackpad input signal is a valid user input, modifying the touch screen touch detection algorithm to the modified touch screen touch detection algorithm. At 436 the method 400 includes, wherein modifying the touch screen touch detection algorithm to the modified touch screen touch detection algorithm comprises reducing a touch detection sensitivity of the touch screen touch detection algorithm.

With reference now to FIG. 4B, at 440 the method 400 includes, after reducing the touch detection sensitivity of the touch screen touch detection algorithm, determining that another valid user input to the trackpad is not received. At 444 the method 400 includes, on condition of determining that the another valid user input to the trackpad is not received, increasing the touch detection sensitivity of the touch screen touch detection algorithm.

At 448 the method 400 includes using the trackpad input signal to determine an estimated handedness of a user. At 452 the method 400 includes modifying the touch screen touch detection algorithm to the modified touch screen touch detection algorithm using the estimated handedness of the user. At 456 the method includes, wherein processing the touch screen input signal with the modified touch screen touch detection algorithm comprises using at least the estimated handedness of the user to determine (1) whether the touch screen input signal represents a user's palm, or (2) a prediction of a direction of motion of a stylus that provided the touch screen input signal.

Figure 5:
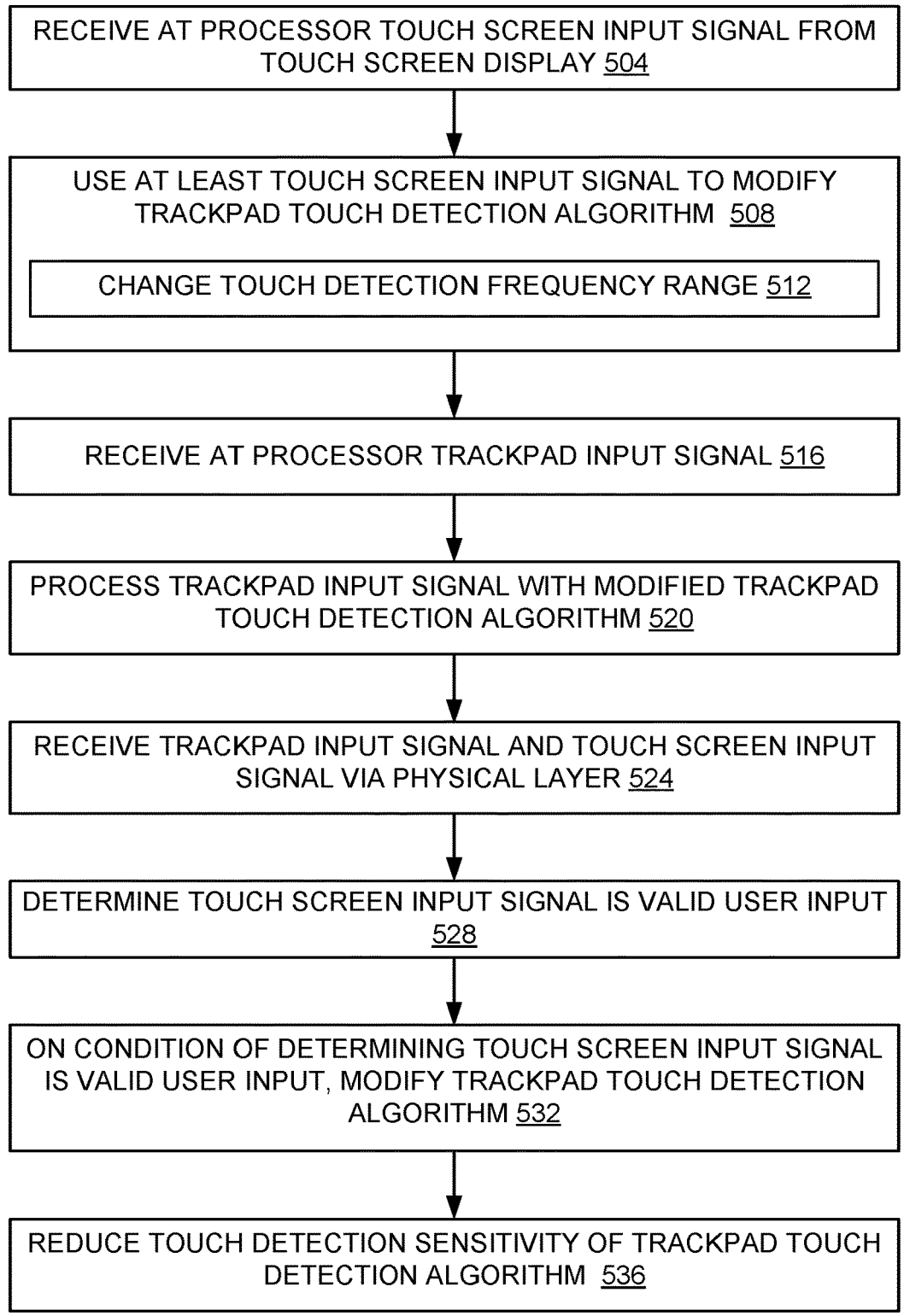
FIG. 5 shows a flow diagram of an example method for performing touch detection on a touch sensitive interface according to examples of the present disclosure.

With reference now to FIG. 5, a flow diagram is illustrated depicting another example method 500 for performing touch detection on a touch sensitive interface. The following description of method 500 is provided with reference to the software and hardware components described herein and shown in FIGS. 1-3 and 6. For example, the method 500 may be performed by computing device 100, hardware, software, and/or firmware of the computing device 100, or a suitable combination of components described herein.

It will be appreciated that the following description of method 500 is provided by way of example and is not meant to be limiting. Therefore, it is to be understood that method 500 may include additional and/or alternative steps relative to those illustrated in FIG. 5. Further, it is to be understood that the steps of method 500 may be performed in any suitable order. Further still, it is to be understood that one or more steps may be omitted from method 500 without departing from the scope of this disclosure. It will also be appreciated that method 500 also may be performed in other contexts using other suitable components.

With reference to FIG. 5, at 504 the method 500 includes receiving at the processor a touch screen input signal from the touch screen display. At 508 the method 500 includes using at least the touch screen input signal to modify a trackpad touch detection algorithm to a modified trackpad touch detection algorithm. At 512 the method 500 includes, wherein modifying the trackpad touch detection algorithm includes changing a touch detection frequency range. At 516 the method 500 includes receiving at the processor a trackpad input signal from the trackpad. At 520 the method 500 includes processing the trackpad input signal with the modified trackpad touch detection algorithm.

At 524 the method 500 includes wherein the processor receives the trackpad input signal and the touch screen input signal via a physical layer. At 528 the method 500 includes determining that the touch screen input signal is a valid user input. At 532 the method 500 includes, on condition of determining that the touch screen input signal is a valid user input, modifying the trackpad touch detection algorithm to the modified trackpad touch detection algorithm. At 536 the method 500 includes, wherein modifying the trackpad touch detection algorithm to the modified trackpad touch detection algorithm comprises reducing a touch detection sensitivity of the trackpad touch detection algorithm.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
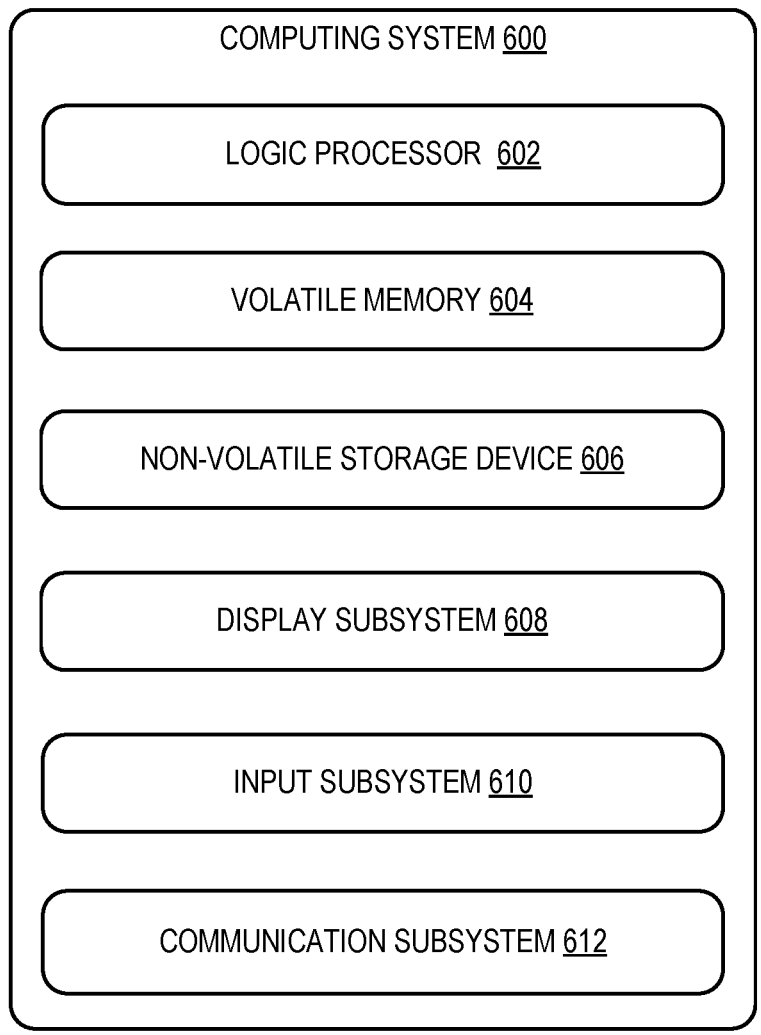
FIG. 6 shows a block diagram of an example computing system according to examples of the present disclosure.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, gaming devices, mobile computing devices, mobile communication devices (e.g., smart phone), wearable computing devices, and/or other computing devices. The laptop computing device 100 described above may comprise computing system 600 or one or more aspects of computing system 600.

Computing system 600 includes a logic processor 602, volatile memory 604, and a non-volatile storage device 606. Computing system 600 may optionally include a display sub system 608, input sub system 610, communication sub system 612, and/or other components not shown in FIG. 6.

Logic processor 602 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 604 may include physical devices that include random access memory (RAM). Volatile memory 604 is typically utilized by logic processor 602 to temporarily store information during processing of software instructions. It will be appreciated that volatile memory 604 typically does not continue to store instructions when power is cut to the volatile memory 604.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, trackpad (virtual or physical), electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a method for performing touch detection on a touch sensitive interface of a computing device, the computing device comprising a processor, a first touch sensitive interface, and a second touch sensitive interface, the method comprising receiving at the processor a first touch input signal from the first touch sensitive interface; using at least the first touch input signal to modify a touch detection algorithm associated with the second touch sensitive interface to a modified touch detection algorithm for the second touch sensitive interface; receiving at the processor a second touch input signal from the second touch sensitive interface; and processing the second touch input signal with the modified touch detection algorithm.

The method may additionally or alternatively include, wherein the first touch sensitive interface is a touch screen display and the second touch sensitive interface is a trackpad, the first touch input signal is a trackpad input signal from the trackpad, and the second touch input signal is a touch screen input signal from the touch screen display; or the first touch sensitive interface is a trackpad and the second touch sensitive interface is a touch screen interface, the first touch input signal is a touchscreen input signal from the touchscreen, and the second touch input signal is a trackpad input signal from the trackpad display. The method may additionally or alternatively include, wherein the processor receives the first touch input signal and the second touch input signal via a physical layer. The method may additionally or alternatively include, wherein modifying the touch detection algorithm associated with the second touch sensitive interface comprises changing a touch detection frequency range.

The method may additionally or alternatively include, determining that the first touch input signal is a valid user input; and on condition of the determining that the first touch input signal is a valid user input, modifying the second touch detection algorithm to the modified second touch detection algorithm. The method may additionally or alternatively include, wherein modifying the second touch detection algorithm to the modified second touch detection algorithm comprises reducing a touch detection sensitivity of the second touch detection algorithm. The method may additionally or alternatively include, after reducing the touch detection sensitivity of the touch second detection algorithm: determining that another valid user input to the first touch sensitive interface is not received; and on condition of the determining that the another valid user input to the first touch sensitive interface is not received, increasing the touch detection sensitivity of the second touch detection algorithm.

The method may additionally or alternatively include, using the first touch input signal to determine an estimated handedness of a user; and modifying the second touch detection algorithm to the modified second touch detection algorithm using the estimated handedness of the user. The method may additionally or alternatively include, wherein processing the second touch input signal with the modified second touch detection algorithm comprises using at least the estimated handedness of the user to determine (1) whether the second touch input signal represents a user's palm, or (2) a prediction of a direction of motion of a stylus that provided the second touch input signal.

Another aspect provides a computing device, comprising: a touch screen display; a trackpad; a processor; and a memory storing instructions executable by the processor to carry out a method for performing touch detection on the touch screen display and the trackpad according to any of the techniques described herein.

Another aspect provides a computer program which when executed on a processor of a computing device having a trackpad and a touch screen display is configured to carry out a method for performing touch detection on the touch screen display and the trackpad according to any of the techniques described herein.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for performing touch detection on a touch sensitive interface of a computing device, the computing device comprising a processor, a first touch sensitive interface, and a second touch sensitive interface, the method comprising:
    receiving at the processor a first touch input signal from the first touch sensitive interface;
    using at least the first touch input signal to determine an estimated handedness of a user;
    using at least the estimated handedness of the user, modifying a touch detection algorithm associated with the second touch sensitive interface to a modified touch detection algorithm for the second touch sensitive interface;
    receiving at the processor a second touch input signal from the second touch sensitive interface; and
    processing the second touch input signal with the modified touch detection algorithm.

2. The method of claim 1 wherein:
    the first touch sensitive interface is a trackpad and the second touch sensitive interface is a touch screen interface, the first touch input signal is a trackpad input signal from the trackpad, and the second touch input signal is a touchscreen input signal from the touchscreen.

3. The method of claim 1, wherein modifying the touch detection algorithm associated with the second touch sensitive interface comprises changing a touch detection frequency range.

4. The method of claim 1, further comprising:
    determining that the first touch input signal is a valid user input; and
    on condition of the determining that the first touch input signal is a valid user input, modifying the touch detection algorithm to the modified touch detection algorithm.

5. The method of claim 1, wherein modifying the touch detection algorithm to the modified touch detection algorithm comprises reducing a touch detection sensitivity of the touch detection algorithm.

6. The method of claim 5, further comprising, after reducing the touch detection sensitivity of the touch detection algorithm:
    determining that another valid user input to the first touch sensitive interface is not received; and
    on condition of the determining that the another valid user input to the first touch sensitive interface is not received, increasing the touch detection sensitivity of the touch detection algorithm.

7. The method of claim 1, wherein processing the second touch input signal with the modified touch detection algorithm comprises using at least the estimated handedness of the user to determine (1) whether the second touch input signal represents a user's palm, or (2) a prediction of a direction of motion of a stylus that provided the second touch input signal.

8. The method of claim 1, wherein the processor receives the first touch input signal and the second touch input signal via a physical layer.

9. A computing device, comprising:
    a touch screen display;
    a trackpad;
    a processor;
    and a memory storing instructions executable by the processor to perform touch detection on the touch screen display and the trackpad,
    the instructions executable to:
    receive at the processor a first touch input signal from a first touch sensitive interface;
    use at least the first touch input signal to determine an estimated handedness of a user;
    using at least the estimated handedness of the user, modify a touch detection algorithm associated with a second touch sensitive interface to a modified touch detection algorithm for the second touch sensitive interface;
    receive at the processor a second touch input signal from the second touch sensitive interface;
    and process the second touch input signal with the modified touch detection algorithm.

10. The computing device of claim 9, wherein the first touch input signal is a trackpad input signal from the trackpad, and the second touch input signal is a touchscreen input signal from the touchscreen.

11. The computing device of claim 9, wherein modifying the touch detection algorithm associated with the second touch sensitive interface comprises changing a touch detection frequency range.

12. The computing device of claim 9, wherein the instructions are executable to:
  determine that the first touch input signal is a valid user input; and
  on condition of the determining that the first touch input signal is a valid user input, modify the touch detection algorithm to the modified touch detection algorithm.

13. The computing device of claim 9, wherein modifying the touch detection algorithm to the modified touch detection algorithm comprises reducing a touch detection sensitivity of the touch detection algorithm.

14. The computing device of claim 13, wherein the instructions are executable to, after reducing the touch detection sensitivity of the touch detection algorithm:
  determine that another valid user input to the first touch sensitive interface is not received; and
  on condition of the determining that the another valid user input to the first touch sensitive interface is not received, increase the touch detection sensitivity of the touch detection algorithm.

15. The computing device of claim 9, wherein processing the second touch input signal with the modified touch detection algorithm comprises using at least the estimated handedness of the user to determine (1) whether the second touch input signal represents a user's palm, or (2) a prediction of a direction of motion of a stylus that provided the second touch input signal.

16. The computing device of claim 9, wherein the processor receives the first touch input signal and the second touch input signal via a physical layer.

17. A method for performing touch detection on a touch sensitive interface of a computing device, the computing device comprising a processor, a first touch sensitive interface, and a second touch sensitive interface, the method comprising:
  receiving at the processor a first touch input signal from the first touch sensitive interface via a physical layer;
  using at least the first touch input signal to determine an estimated handedness of a user;
  using at least the estimated handedness of the user, modifying a touch detection algorithm associated with the second touch sensitive interface to a modified touch detection algorithm for the second touch sensitive interface;
  receiving at the processor a second touch input signal from the second touch sensitive interface via the physical layer; and
  processing the second touch input signal with the modified touch detection algorithm;
  wherein the first touch input signal is a trackpad input signal from the trackpad, and the second touch input signal is a touchscreen input signal from the touchscreen.

18. The method of claim 17, wherein modifying the touch detection algorithm associated with the second touch sensitive interface comprises changing a touch detection frequency range.

* * * * *